April 16, 1963  M. F. KRITCHEVER  3,085,293
PLASTIC TUBE FORMING METHOD
Filed April 4, 1960
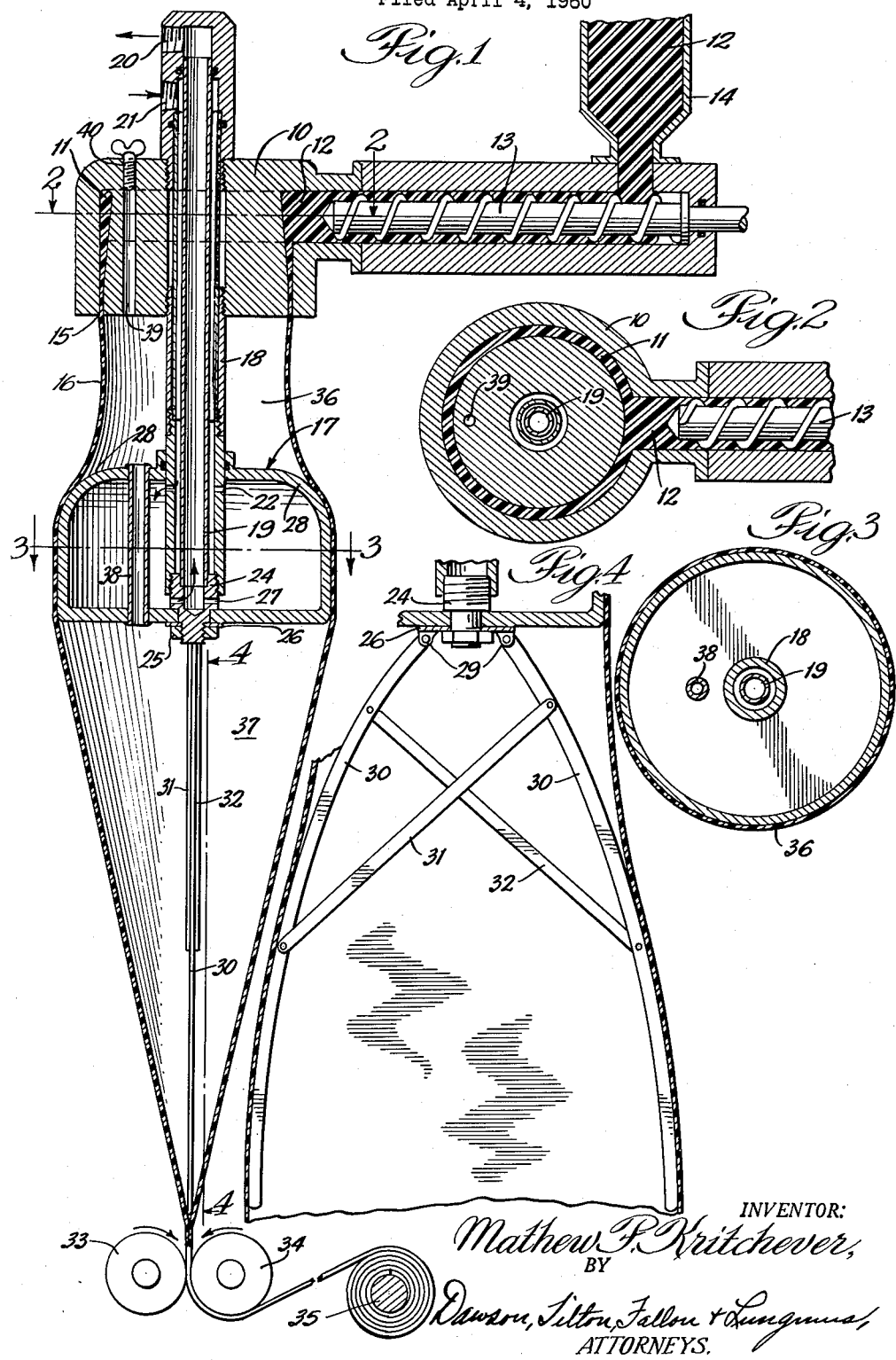
INVENTOR:
Mathew F. Kritchever,
BY
Dawson, Tilton, Fallon & Lungmus,
ATTORNEYS.

United States Patent Office 3,085,293
Patented Apr. 16, 1963

3,085,293
PLASTIC TUBE FORMING METHOD
Mathew F. Kritchever, Glencoe, Ill., assignor, by direct and mesne assignments, to E. I. du Pont de Nemours and Company, Wilmington, Del., a corporation of Delaware
Filed Apr. 4, 1960, Ser. No. 19,719
3 Claims. (Cl. 18—57)

This invention relates to a plastic tube-forming method, and more particularly to method in which a heated thermoplastic resin is extruded in the form of tubular film and recovered in tubular or sheet form.

Among the practices heretofore employed, it has been common to extrude heated thermoplastic resin material downwardly through a die to form a tubular film, the film being drawn over a cooling mandrel and thence over a take-up roller and onto a core. In such prior practices, air pressure has been employed to distend or support the film and also to partially cool the film as it is being extruded. In such operations, it has been found that channeling of air or gas occurs frequently about the mandrel, the streams of air reducing the cooling action and leaving hot streaks in the film which later cause wrinkles and puckers in the roll of film. The hot streak areas vary the gauge of the film, decrease its tensile and tear strengths, resulting in a non-uniform structure, both mechanically and physically. Further, the hot streak areas or uncooled areas contact spreaders located below the mandrel and heat the spreaders so that they weaken other areas of the film. After the material is wound upon the core, it is found that there is an uneven shrinkage due to the areas of hot streaks, and these cause hard spots and further wrinkling.

An object of the present invention is to provide a method by which the above-described disadvantages are overcome. A further object is to provide a method by which pressure or air flow adjustments heretofore required are obviated and a substantially automatic control obtained. A still further object is to provide uniform peripheral cooling by eliminating pressure conditions that cause a leakage of air over the mandrel surface, thereby reducing the cooling action and leaving longitudinal hot streaks in the film. Yet another object is to automatically coordinate the point of contract of hot resin melt with the cooling mandrel and with the mandrel design itself, in order to obtain the maximum effect of reorientation.

A further object is to provide a method whereby the hot film melt which is substantially uncooled is brought into sudden contact with cooled, rounded shoulders on the mandrel so that the cooling is accomplished simultaneously with stretching, giving a great improvement in strength and clarity. A still further object is to provide a method whereby the film being extruded is caused to partially collapse or "neck-in" due to the shrinkage of the material and the absence of positive pressure, with the result that the concave film makes earlier contact with the mandrel and with the rounded shoulders thereof so as to increase the length of the cooling path and to induce sudden stretching to effect a rapid loss of heat. Other specific objects and advantages will appear as the specification proceeds.

The invention is shown, in an illustrative embodiment, by the accompanying drawing, in which—

FIGURE 1 is a vertical sectional view of apparatus embodying my invention; FIG. 2, a broken detail sectional view, the section being taken as indicated at line 2—2 of FIG. 1; FIG. 3, a transverse sectional view, the section being taken as indicated at line 3—3 of FIG. 1; and FIG. 4, a broken sectional detail view, the section being taken as indicated at line 4—4 of FIG. 1.

In the illustration given, 10 designates a die having a circular chamber 11 to which resin, indicated by the numeral 12, is supplied by a screw propeller 13. The resin is supplied to the impeller chamber from a supply vessel indicated generally by the numeral 14. The die chamber 11 has a circular or tubular discharge orifice 15 at the lower end thereof, and from the lips of the orifice is discharged a thin resin film 16. Since the die and extruder which have been described are of well known construction, a further detailed description herein is believed unnecessary.

At a spaced distance below the die 10 is suspended a mandrel 17. In the specific illustration given, the mandrel 17 is suspended by a tubular mast 18 which extends upwardly through the die 10 and is threadedly connected thereto. Within the mast 18 is secured in spaced relation thereto, a smaller tube 19 which communicates at its top with a liquid outlet connection 20 adapted to be connected to a water or other flow pipe (not shown). A liquid inlet connection 21 communicates with the space between pipes 18 and 19 to provide a liquid inlet passage 22, and the pipe 18 is provided with apertures 23 for supplying coolant liquid or fluid to the interior of the mandrel 17.

In the specific illustration given, the pipe 18 is threadedly connected to a hollow plug member 24 having a reduced portion extending through the apertured bottom of mandrel 17 and threaded to engage a nut 25. A washer 26 extends below the mandrel 17 to support the same on the nut 25. The hollow plug 24 is provided with ports 27 to allow the coolant to flow upwardly through the inner pipe 19, forming a press-fit with the upper portion of the hollow plug 24. The hollow mandrel may be provided with baffles or other means for directing the coolant in desired paths, and preferably the coolant is directed first against the rounded shoulders 28 with which the top portion of the mandrel is provided. The rounded shoulders 28 preferably merge with cylindrical side walls of the mandrel 17, and the side walls may, if desired, be tapered slightly inwardly. The washer or strap 26 is preferably provided with extensions to which ears 29 are secured, and the ears 29 support spreader arms 30, the spreader arms being kept in selected positions by cross straps 31 and 32 pinned to the bars 30.

The tubular film is preferably drawn over the spreaders 30 and between two nip rolls or driven haul-off rolls 33 and 34, the tubular film being finally wound upon a core 35. I prefer to have at least one of the nip rolls 33 or 34 driven and have the rolls so supported that they may be brought tightly together to prevent the escape of fluid from the tube portions thereabove. Since such take-up or draw-off roll structures are well known, a detailed description herein is believed unnecessary.

In the structure above described, it is found that the film 16 forms with the die 10, mandrel 17, and the nip rolls, two spaces, an upper space designated by the numeral 36 which extends between the mandrel 17 and die 10, and a lower space designated by the numeral 37 extending between the mandrel 17 and the rolls 33 and 34.

In the practice of my invention, I provide means for establishing communication between the spaces or chambers 36 and 37 so that the conditions in the two chambers are stabilized and kept uniform. In this way, it is found that there is no tendency for air or gas portions to leak around the mandrel, forming channels which insulate the film 16 from the cooled mandrel 17 and forming hot streaks, etc.

The communication between the two chambers can be accomplished by any suitable means. I prefer to employ a relatively large pipe 38 which extends from the lower surface of the mandrel through to the top surface and which is sealed at both ends by welding, soldering, etc. The pipe 38 provides an open and free passage for the flow of fluid between the chambers or spaces 36 and 37.

The diameter of the mandrel 17 may be equal to or less than the diameter of the annular die orifice 15 or greater than the diameter thereof, since, with the smaller dimensions of the mandrel, the concavity or "neck-in" of the film due to natural shrinkage still causes it to expand and be stretched when it strikes the rounded shoulder of the mandrel of reduced dimensions.

The die 10 may be employed with or without a passage 39. For normal operating conditions, the passage 39 is not needed, and, if employed, is preferably kept closed by the threaded plug 40. For relief of gases or for admitting atmospheric air, the plug 40 may be removed. If desired, the operation can be carried on with the plug entirely removed and the vent 39 open to the atmosphere.

OPERATION

In the operation of the apparatus, the extruder 13 is set in operation, forcing the plastic resin 12 through the die and discharging it as tubular film 16 below the die. The annular resin web proceeds downwardly toward the mandrel, and when it is relatively close to the mandrel, the material is stretched outwardly by the operator and pulled over the mandrel. This pulling continues until the material may be introduced to the driven haul-off rolls 33 and 34 and the driven rolls are operated at a desired speed for pulling the film over the mandrel. An adjustment between the surface speed of the haul-off rolls relative to the volume of the thermoplastic resin supplied by the extruder will determine the gauge of the finished film.

Since no pressure is maintained in the upper space 36 between the die and the mandrel, the natural shrinkage of the plastic causes it to partially collapse inwardly or "neck-in," and the concave surfaces make contact with the rounded shoulders 28 of the mandrel 17 where it is subjected to sudden cooling and simultaneous stretching. The sudden stretching induces a rapid loss of heat, thereby reducing the cooling load which is placed upon the mandrel. At the same time, a maximum effect of reorientation of the molecules is obtained and the strength of the film greatly increased. Because of the uniform and extensive cooling, the speed of operation can be substantially doubled. The operation is automatic, with no variability in the cooling path since the point of contact is constant, and the only necessary adjustment required of the operator is the temperature control to adjust the cooling temperature.

As above stated, the operation may be carried on continuously without admitting air or gas, the vent 38 in the mandrel permitting air flow between the spaces 36 and 37. If it is desired to admit atmospheric air to the chamber 37, a temporary slit may be formed in the film 16 for this purpose or the plug 40 may be opened. Further, if it should be desired to vent gases from the chamber, this may be accomplished by removing the plug 40. If desired, the operation may be carried on with the chambers 36 and 37 constantly in open communication with the atmosphere, the plug 40 being removed and the passage 39 being left continuously open. Since the atmospheric pressure within the spaces 36 and 37 would thus be equal to the pressure outside, there would be no positive pressure, and the film 16 will form the concavity or partially collapsed condition desired for forming early contact with the rounded shoulders 28. The amount of concavity or "necking-in" will vary with the distance between the die and the mandrel, and the distance between the die and the mandrel may vary somewhat in proportion to die size, this distance usually being from 4–10" in the case of an 8" die and from 3–6" in the case of a 4" die, etc., but greater or lesser distances may be used. In my preferred practice, all communication with the outside atmosphere is cut off and the spaces 36 and 37 are operated without the admission of fluid thereinto, the spaces, however, being kept in open communication with each other by the vent pipe 38.

Examples of the process may be set out as follows:

Example I

Polyethylene having a density of .923 was extruded at a temperature of 270° F. through an annular die opening 4" in diameter at the rate of 70 lbs. per hour in apparatus as described in the drawing of this application, the tubular film being drawn over the vented, cooled mandrel which was 5.814" in diameter, producing a tube having a flattened width of 9" and a gauge of one mil (0.001"), at an approximate linear speed of 165 feet per minute. The extruded tube was uniformly cooled about its periphery and left the mandrel at a temperature of 90° F. The high rate of heat extraction was obtained by employing the mandrel shown in the drawing, having a curved approach and by permitting the molten polyethylene to shrink in a partially constricted or concave form as indicated in the drawing prior to contacting the mandrel, so that maximum surface contact travel was accomplished, while at the same time the rapid expansion of the molten polyethylene over the rounded shoulders induced a substantial heat loss to the exterior air. This reduced the heat-removal load imposed upon the cooled mandrel. No air or other gas was introduced into the tube during the operation, so that there was substantially atmospheric pressure at all points both within and outside the tubing and also both above and below the mandrel, so that the natural shrinkage of the hot molten polyethylene was counteracted by the linear tension under which it was placed to prevent collapse inwardly of the rounded approach or shoulder.

The clarity and strength of the tube was found to be increased by the above atmospheric pressure balance and the shrinkage of the polyethylene prior to contacting the rounded shoulders.

Example II

The process was carried out as described in Example I except that the polyethylene density was .945, the temperature 350° F., the hourly poundage rate 100, and the linear speed approximately 230 feet per minute, with the film leaving the mandrel at a temperature of 175° F. Results similar to those described in Example I were obtained.

Example III

The process was carried out as described in Example I except that polyethylene having a density of .930 was extruded through an 8" diameter annular die at a linear speed of 130 feet per minute. The polyethylene was delivered through the die at 290° F. and formed into a seamless tube having a flat width of 24" and a wall thickness of 0.6 mil (0.0006"). The hourly poundage was 90 and the film left the mandrel at 85° F. The results were comparable to those obtained in Example I.

Example IV

The process was carried out generally as described in Example I, with the following variations: The polyethylene had a density of .923 and was extruded at a temperature of 290° F. through a die having an 8" diameter opening 0.020" wide over the vented mandrel which was cooled to 70° F., the mandrel having a diameter which produced a flattened seamless tubing 18" wide, and the tubing leaving the mandrel at 100° F. The extruder was operated to deliver 145 pounds of molten polyethylene per hour, and the take-up or haul-off pinch rolls were operated at a surface speed of approximately 135 feet per minute to provide a tube having a wall thickness of 0.00125" or 1¼ mils. An extremely strong tube of great clarity was obtained.

Example V

Polypropylene having a density of .895 was extruded at 430° F. through an annular die of 8" diameter opening of 0.020" over a vented mandrel maintained at 180° F., the apparatus being that shown in the drawing of the application. The mandrel had a diameter which produced flattened seamless tubing 24" wide. The polypropylene was extruded at the rate of 188 pounds per hour and the take-up or pinch rolls were adjusted to operate at 170 surface feet per minute to produce a tubing having a wall thickness of one mil. The polypropylene left the mandrel at a temperature of 240° F. The resulting film was an excellent strong and clear product.

While, in the foregoing specification, I have set forth a specific structure in considerable detail for the purpose of indicating preferred structure and steps of procedure, it will be understood that such details may be varied widely by those skilled in the art without departing from the spirit of my invention.

I claim:

1. In a method for forming a tubular thermoplastic film, the steps of extruding a heated thermoplastic resin through a tubular die to form a film, drawing the film over a hollow mandrel in air-sealing relation therewith and thence over a take-up roll to form an upper enclosed air space between the mandrel and the die and a lower enclosed air space between the roll and the mandrel, partially collapsing the film portion between the die and the mandrel passing a coolant through said mandrel to cool the same, and establishing open and unrestricted air-flow communication between said upper and lower spaces to equalize the pressures therein.

2. In a method for forming a tubular plastic film, the steps of extruding a heated thermoplastic resin through a tubular die to form a tubular film, drawing the film over a mandrel in air-sealing relation therewith and thence over a take-up roll to form an upper enclosed air space between the mandrel and the die and a lower enclosed air space between the roll and the mandrel, passing a coolant through said mandrel to cool the same, partially collapsing the film between said die and mandrel, and drawing said partially collapsed film against rounded cooling surfaces on the mandrel while establishing open and unrestricted air-flow communication between said upper and lower spaces to equalize the pressures therein.

3. In a method for forming a tubular thermoplastic film, the steps of extruding a heated thermoplastic resin through a tubular die to form a tubular film, drawing the film over a mandrel having rounded cooling surfaces and providing an air space between the mandrel and the die, passing a coolant through the mandrel to cool the same, maintaining the space between the mandrel and the die in open communication with the atmosphere, partially collapsing the film between said die and mandrel, and drawing said partially collapsed film against said rounded cooling surfaces on the mandrel.

References Cited in the file of this patent

UNITED STATES PATENTS

| | | |
|---|---|---|
| 2,433,937 | Tornberg | Jan. 6, 1948 |
| 2,720,680 | Gerow | Oct. 18, 1955 |
| 2,966,700 | Dyer et al. | Jan. 3, 1961 |

FOREIGN PATENTS

| | | |
|---|---|---|
| 1,056,817 | Germany | May 6, 1959 |